US009506813B2

(12) United States Patent
Aberra et al.

(10) Patent No.: US 9,506,813 B2
(45) Date of Patent: Nov. 29, 2016

(54) DIGITAL TEMPERATURE SENSOR WITH INTEGRATED DIGITAL TEMPERATURE FILTER

(71) Applicant: Microchip Technology Incorporated, Chandler, AZ (US)

(72) Inventors: Ezana Aberra, Austin, TX (US); Patrick Richards, Peoria, AZ (US); Richard Appel, Hampton, NH (US); Sam Alexander, Phoenix, AZ (US); Stephen Loyer, Gilbert, AZ (US); Kumen Blake, Gilbert, AZ (US); Sean Cappy, Marlborough, MA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/581,313

(22) Filed: Dec. 23, 2014

(65) Prior Publication Data

US 2015/0185083 A1 Jul. 2, 2015

Related U.S. Application Data

(60) Provisional application No. 61/921,167, filed on Dec. 27, 2013.

(51) Int. Cl.
*G01K 1/02* (2006.01)
*G01K 7/01* (2006.01)

(52) U.S. Cl.
CPC . *G01K 1/02* (2013.01); *G01K 7/01* (2013.01); *G01K 2219/00* (2013.01)

(58) Field of Classification Search
CPC .......... G01K 1/02; G01K 7/425; G01K 7/01; G01K 2219/00
USPC ......... 374/170, 171; 327/512, 513; 702/130, 702/99
See application file for complete search history.

(56) References Cited

U.S. PATENT DOCUMENTS

| | | | | |
|---|---|---|---|---|
| 5,519,265 A | * | 5/1996 | Latham, II | H03H 11/1291 327/101 |
| 5,519,644 A | * | 5/1996 | Benton | G01K 1/026 374/132 |
| 6,377,110 B1 | * | 4/2002 | Cooper | G01K 15/00 327/513 |
| 2001/0021217 A1 | | 9/2001 | Gunther et al. | 374/178 |
| 2004/0004994 A1 | * | 1/2004 | Wu | G01K 1/028 374/170 |
| 2004/0131104 A1 | | 7/2004 | Seferian | 374/178 |
| 2005/0017889 A1 | * | 1/2005 | Stockstad | G01K 7/01 341/164 |
| 2005/0063120 A1 | * | 3/2005 | Sinha | G01K 15/00 361/103 |
| 2005/0126183 A1 | * | 6/2005 | Nakamura | F01D 21/003 60/803 |
| 2007/0126619 A1 | * | 6/2007 | McGrath | G01K 7/01 341/155 |
| 2007/0280330 A1 | | 12/2007 | Jeong et al. | 374/141 |

(Continued)

FOREIGN PATENT DOCUMENTS

WO 02/27449 A2 4/2002 ............... G06F 1/20

OTHER PUBLICATIONS

International Search Report and Written Opinion, Application No. PCT/US2014/072225, 12 pages, Mar. 16, 2015.

*Primary Examiner* — Lisa Caputo
*Assistant Examiner* — Philip Cotey
(74) *Attorney, Agent, or Firm* — Slayden Grubert Beard PLLC

(57) ABSTRACT

An integrated temperature sensor device has a temperature sensor configured to provide an analog signal corresponding to an ambient temperature, an analog-to-digital converter receiving the analog signal and a programmable digital filter coupled to the analog-to-digital converter.

18 Claims, 2 Drawing Sheets

(56) References Cited

U.S. PATENT DOCUMENTS

| | | | |
|---|---|---|---|
| 2009/0161726 A1* | 6/2009 | Miyamoto | G01K 7/42 374/172 |
| 2009/0196322 A1* | 8/2009 | McCarthy | G01R 19/2506 374/170 |
| 2009/0237959 A1* | 9/2009 | Soenen | H02M 3/1588 363/13 |
| 2010/0010769 A1* | 1/2010 | Houldsworth | G01K 13/10 702/130 |
| 2013/0218512 A1* | 8/2013 | Kim | G01K 7/00 702/130 |

* cited by examiner

DIGITAL TEMPERATURE SENSOR WITH INTEGRATED DIGITAL TEMPERATURE FILTER

CROSS-REFERENCE TO RELATED APPLICATIONS

This application claims priority from U.S. Provisional Patent Application Ser. No. 61/921,167 filed Dec. 27, 2013, which is hereby incorporated by reference in its entirety as if fully set forth herein

TECHNICAL FIELD

The present disclosure relates to digital temperature sensor devices, in particular to a digital temperature sensor with integrated digital temperature filter.

BACKGROUND

A variety of integrated semiconductor temperature sensor exists. Such sensors are available in housings having a low number of pins and may provide a either an analog or a digital interface. Analog temperature sensors typically output a voltage that is proportional to the measured temperature while digital temperature sensors provide for a digital interface that is designed to encode the temperature value into a digital value and provide these to a processor, for example using a serial interface. To keep the number of pins low, these digital temperature sensors often use a single wire interface. However, other devices may use interfaces with more than one wire. While such digital temperature sensors are convenient and can be used in many applications, certain applications may in addition require post-processing of the temperature values. Hence, there exists a need for improved digital temperature sensors.

SUMMARY

According to an embodiment, an integrated temperature sensor device may comprise a temperature sensor configured to provide an analog signal corresponding to an ambient temperature; an analog-to-digital converter receiving the analog signal; and a programmable digital filter coupled to the analog-to-digital converter.

According to a further embodiment, the temperature sensor may comprise a sensor element; and a sensor conditioning circuit coupled with the sensor element. According to a further embodiment, the sensor element can be a semiconductor diode. According to a further embodiment, the integrated temperature sensor device may further comprise a first register coupled with the analog-to-digital converter for storing the output of the analog-to-digital converter. According to a further embodiment, the integrated temperature sensor device may further comprise a second register coupled with the digital filter for storing the filtered temperature value. According to a further embodiment, the integrated temperature sensor device may further comprise a control register coupled with the digital filter for storing filter coefficients of said programmable digital filter. According to a further embodiment, the control register can be configured to disable the digital filter. According to a further embodiment, the control register can be set to 0 to disable the digital filter. According to a further embodiment, the control register may select one of a plurality of predefined filter coefficients. According to a further embodiment, the analog-to-digital converter can be a high speed analog-to-digital converter operable to provide about 200 conversions per second. According to a further embodiment, the integrated temperature sensor device may further comprise a serial interface which may be selected form the group consisting of SPI, I$^2$C, or a single wire serial interface.

According to another embodiment, a method for operating an integrated temperature sensor device comprising the steps of: converting an analog value provided by the sensor element into a digital temperature value by an analog-to-digital converter, storing the digital value in an associated temperature register, feeding the digital temperature value to a digital filter, and storing a filtered temperature value in an associated filtered temperature register.

According to a further embodiment of the method, the sensor element is a semiconductor diode. According to a further embodiment of the method, the method may further comprise storing a control value in a control register coupled with the digital filter for selecting a filter coefficients. According to a further embodiment of the method, the control register is configured to disable the digital filter when the associated control value is 0. According to a further embodiment of the method, the control value is stored in a plurality of bits of said control register. According to a further embodiment of the method, the control register selects one of a plurality of predefined filter coefficients. According to a further embodiment of the method, the temperature register and/or the filtered temperature register can be read by a microprocessor or microcontroller via a serial interface of the integrated temperature sensor device. According to a further embodiment of the method, the serial interface is selected form the group consisting of SPI, I$^2$C, or a single wire serial interface. According to a further embodiment of the method, the analog-to-digital converter is a high speed analog-to-digital converter operable to provide about 200 conversions per second.

DETAILED DESCRIPTION

According to various embodiments, a digital temperature sensor may comprise a digital filter feature which enables a user to control the temperature sensor sensitivity. According to various embodiments, a variety of such filters may be implemented. The lowest filter setting enables the user to detect fast thermal transients, and the highest filter setting reduces the sensor sensitivity, outputting gradual changes in temperature. The temperature sensor may be configurable, for example comprising a configuration register which can be configured through a serial interface of the device.

According to various embodiments, such a low power and digital temperature sensor may output temperature data at faster speeds than conventional devices, for example at 5 millisecond intervals (typically), or 200 times per second, for a high resolution temperature data. This rate is approximately 25 times faster than the speed of a conventional temperature sensor. Due to this high speed conversion rate, the device spends less time in the temperature conversion mode which saves the overall operating power when it is used in conjunction with the low power or shutdown mode. However, due to the fast temperature conversion, fast thermal transients may be detected from the application and the device may output false temperature alerts. The solution is to implement an integrated digital filter with the options for the user to adjust the filter coefficient or the filter strength.

Typically, if the application needs a digital filter, a microcontroller is used to process and filter the temperature data. According to various embodiments, the microcontroller consumes significantly higher operating current or power than the temperature sensor. Therefore, this integrated feature eliminates the associated processing requirements of a microcontroller and makes the digital temperature sensor according to various embodiments ideal for extremely low power applications.

Figure 1:
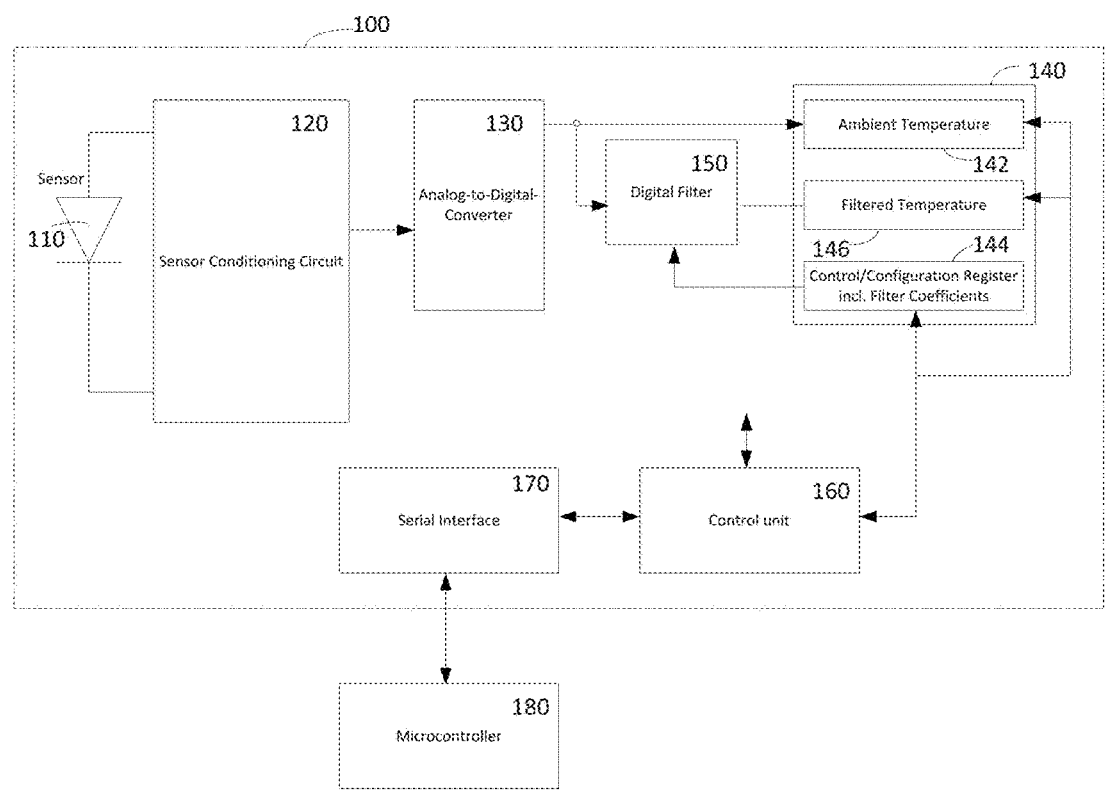
FIG. 1 shows a block diagram according to various embodiments.

According to some embodiments, there can be several functional blocks to a temperature sensor 100 according to various embodiments as shown in FIG. 1: the sensor proper 110 and an associated conditioning circuit 120, an analog to digital converter 130, and user programmable registers 140. A diode 110 may be used in this example to measure temperature and the sensor conditioning circuit 120 is used to bias the sensor diode 110 and scale the diode voltage to measurable levels. However, according to other embodiments, other type of sensors and if necessary conditioning circuits may be used. Basically the temperature sensor provides for an analog signal, such as a voltage or a current that can easily be converted into a temperature value. The analog value may be proportional to the temperature or may have a known linear or non-linear relationship. For example, tables stored in memory may be used within the sensor device to retrieve a temperature value corresponding to the analog value.

The analog to digital converter 130 is used to convert the ambient temperature data in digital format. The digital temperature data is available to the user in the user Ambient Temperature data register 142. The temperature sensor may be designed to be configurable through the registers 140. For example, different operating modes may be available such as a request mode in which values are only transmitted upon request or an auto transmit mode in which temperature values are automatically transmitted in predetermined intervals. Yet another operating mode that may be implemented would provide a notification signal to the microcontroller or processor that new data can be read from the temperature sensor device. According to yet another mode, automatic transmission of new temperature values would take place once a predefined delta temperature value has been detected, or when combined with the notification mode, a notification of a new temperature that exceeded a predefined delta or absolute temperature value could be issued by the temperature sensor device. Other operating modes may be implemented. According to some embodiments, multiple operating modes may be implemented as described above wherein a user could programmably select one of the plurality of operating modes.

According to various embodiments, a digital filter block 150 is provided, wherein the ambient temperature digital data is passed through the filter engine of the digital filter 150. The filter coefficients or filter strength can be adjusted by the user using the Filter Coefficients data register 144. The filtered data is then available in the Filtered Temperature Register 146.

Such an arrangement allows for extremely low power thermal management. The sensor 100 according to various embodiments filters temperature data to prevent false alerts and is about 25× faster than a conventional device, wherein its short operating time saves power.

A typical microcontroller task includes conditioning temperature data by averaging multiple reads to reduce false temperature alerts, this consumes power by the microcontroller (much more than the sensor). Fast conversion time increases sensitivity to measuring system thermal noise. The added digital filter 150 with user programmable filter strength allows the device to manage thermal data within the temperature sensor so the microcontroller doesn't have to wake-up to perform this task.

Table 1 shows an example of a digital filter to be used in a temperature sensor 100 as shown in FIG. 1 according to various embodiments.

TABLE 1

| BIT 6-4 | N-FILTER COEFFICIENT: |
| --- | --- |
|  | 000 = 0 (No Filter – $T_{A\_FLT} = T_A$) |
|  | 001 = 1 Minimum Filter |
|  | 010 = 2 |
|  | 011 = 3 |
|  | 100 = 4 |
|  | 101 = 5 |
|  | 110 = 6 |
|  | 111 = 7 Maximum Filter |

Thus, the values stored in the control register 144, for example, in bits 6-4 of the control register as shown in table 1, are used as an index to select one of a plurality of predefined filter coefficients. Other bits could be used according to various embodiments and the above mentioned specific bits are merely an example. Hence, a user merely needs to store a selection number to activate a specific filter function. If the index is equal to 0, then the entire filter will be disabled. However, other embodiments may use a different configuration process. For example, the filter may have a plurality of variable parameters and a user may directly program these parameters into various registers. While this option provides a user more control over the filter, it also would involve a more complicated set-up procedure. More than one type of filter or other additional functions can be implemented and a user may have the opportunity to select one of the plurality of filters or post processing routines. For example, a digital temperature sensor device according to various embodiments may have additional averaging routines and associated registers that store selectable or predefined averaging numbers. Various averaging routines could be implemented that calculate a mean or geometric average and optional other statistical values.

Figure 2:
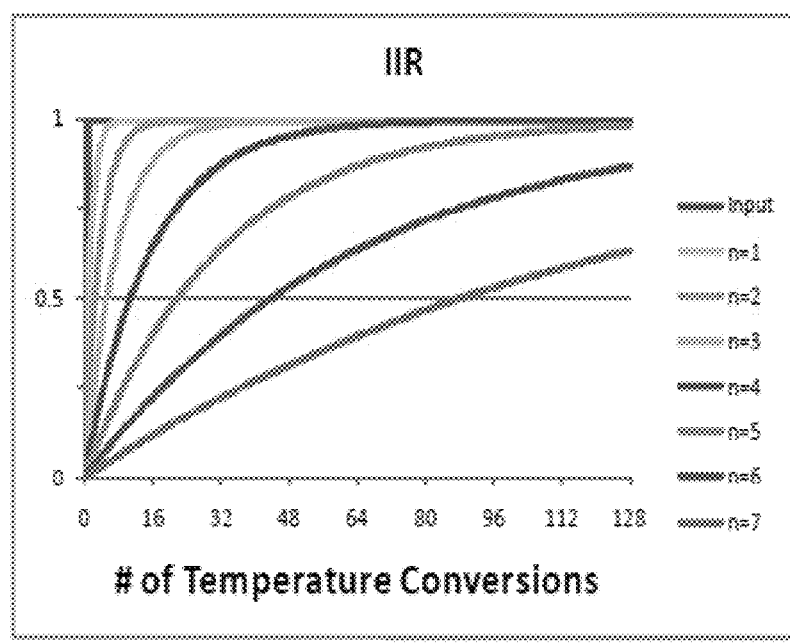
FIG. 2 shows a graph depicting transfer functions for various filter coefficients.

In this embodiment, the filter is an infinite impulse response low pass filter. According to an embodiment, eight different filter coefficient settings may be provided. Three bits of a control register 144 may provide for these options as explained above. However, more or less options may be provided according to other embodiments. In addition, the control register may have more bits that can be used for other configurations such as operating mode as discussed above. As can be seen in FIG. 2, if the filter coefficient is set to zero, no filter function will be applied. Thus this setting can be used as a disable function. The remaining seven settings span from a minimum to a maximum filter function.

The digital temperature sensor 100 may further have control logic 160 for performing the filter function and may also include, for example a digital serial interface 170 for communication with an external microprocessor or microcontroller 180. The serial interface 170 may allow for access to all registers 140 to set the functionality, for example digital filter function and read the temperature data from at least one or more temperature registers 140, 146. The serial interface can be any type of serial interface such as an serial peripheral interface (SPI), an I²C interface, or in particular any type of single wire interfaces, such as UNI/O, 1-WIRE, etc. Serial interface may also be used which are capable to supply power over the single communication line to further reduce the number of external pins. Other functions may be configured as discussed above.

As shown in FIG. 1, the measured temperature may be stored in a separate register 142 and the filtered temperature value may be stored in another register 146. Further control registers for controlling the analog-to-digital converter, for example speed and resolution may be present.

Typically, the temperature conversion rate of conventional digital sensors is about 4 to 8 times per second for a high resolution data device. During this slow conversion time the device consumes continuous current and if a digital filter is implemented by a microcontroller, then the controller can measure and filter the temperature data within fractions of the sensor conversion time, or power. Therefore, there isn't much advantage in implementing an integrated digital filter with slow conversion time sensors. But using a fast conversion time of a temperature sensor according to various embodiments saves power, and the filter feature saves power by off-loading the data processing need from the controller.

FIG. 2 shows the infinite impulse response (IIR) low pass filter depending on the various settings. A filtered temperature will be processed as follows:

$$T_{A\_FLT} = a \cdot T_A + (1-a) \cdot T_{A\_PRV} \quad \text{Eq. 1}$$

This equation 1 can be simplified as:

$$T_{A\_FLT} = a \cdot T_A - T_{A\_PRV} \cdot a + T_{A\_PRV} \quad \text{Eq. 2}$$

wherein $a = 1/2^n$ and n is a user selectable filter coefficient.

What is claimed is:

1. Integrated temperature sensor device comprising:
    a temperature sensor configured to provide an analog signal corresponding to an ambient temperature;
    an analog-to-digital converter receiving the analog signal and generating a plurality of subsequent digital temperature values;
    a controllable digital filter coupled to the analog-to-digital converter and configured to receive said digital temperature values, wherein the controllable digital filter is configured to adjust a temperature value rate of change of said plurality of subsequent digital temperature values;
    a first register coupled with the analog-to-digital converter for storing the output of the analog-to-digital converter;
    a second register coupled with the digital filter for storing the filtered temperature value; and
    a serial interface configured to access said first and second register.

2. The integrated temperature sensor device according to claim 1, wherein the temperature sensor comprises:
    a sensor element; and
    a sensor conditioning circuit coupled with the sensor element.

3. The integrated temperature sensor device according to claim 2, wherein the sensor element is a semiconductor diode.

4. The integrated temperature sensor device according to claim 1, further comprising a control register coupled with the digital filter for storing filter coefficients of said configurable digital filter.

5. The integrated temperature sensor device according to claim 4, wherein the control register is configured to disable the digital filter.

6. The integrated temperature sensor device according to claim 5, wherein the control register is set to 0 to disable the digital filter.

7. The integrated temperature sensor device according to claim 4, wherein the control register selects one of a plurality of predefined filter coefficients, wherein a lowest filter setting enables a detection of fast thermal transients, and a highest filter setting reduces the sensor sensitivity thereby outputting gradual changes in temperature.

8. The integrated temperature sensor device according to claim 1, wherein the analog-to-digital converter is a high speed analog-to-digital converter operable to provide about 200 conversions per second.

9. The integrated temperature sensor device according to claim 1, wherein the serial interface is selected form the group consisting of SPI, I²C, or a single wire serial interface.

10. A method for operating an integrated temperature sensor device comprising the steps of:
    converting an analog value provided by the sensor element into a digital temperature value by an analog-to-digital converter,
    storing the digital value in an associated temperature register,
    feeding the digital temperature value to a digital filter, wherein the digital filter adjusts a sensor temperature sensitivity,
    storing a filtered temperature value in an associated filtered temperature register;
    receiving a read command through a serial interface; and
    accessing depending on the read command either said temperature register or said filtered temperature register.

11. The method according to claim 10, wherein the sensor element is a semiconductor diode.

12. The method according to claim 10, further comprising storing a control value in a control register coupled with the digital filter for selecting a filter coefficients.

13. The method according to claim 12, wherein the control register is configured to disable the digital filter when the associated control value is 0.

14. The method according to claim 13, wherein the control value is stored in a plurality of bits of said control register.

15. The method according to claim 12, wherein the control register selects one of a plurality of predefined filter coefficients, wherein a lowest filter setting enables a detection of fast thermal transients, and a highest filter setting reduces the sensor sensitivity thereby outputting gradual changes in temperature.

16. The method according to claim 10, wherein the temperature register and/or the filtered temperature register can be read by a microprocessor or microcontroller via the serial interface of the integrated temperature sensor device.

17. The method according to claim 16, wherein the serial interface is selected form the group consisting of SPI, I²C, or a single wire serial interface.

18. The method according to claim 10, wherein the analog-to-digital converter is a high speed analog-to-digital converter operable to provide about 200 conversions per second.

* * * * *